US012098259B2

(12) United States Patent
Slattegard

(10) Patent No.: US 12,098,259 B2
(45) Date of Patent: Sep. 24, 2024

(54) POROUS MATERIAL OF CELLULOSE FIBRES AND GLUTEN

(71) Applicant: STORA ENSO OYJ, Helsinki (FI)

(72) Inventor: Rikard Slattegard, Danderyd (SE)

(73) Assignee: STORA ENSO OYJ, Helsinki (FI)

( * ) Notice: Subject to any disclaimer, the term of this patent is extended or adjusted under 35 U.S.C. 154(b) by 83 days.

(21) Appl. No.: 17/259,097

(22) PCT Filed: Jul. 1, 2019

(86) PCT No.: PCT/EP2019/067639
§ 371 (c)(1),
(2) Date: Jan. 8, 2021

(87) PCT Pub. No.: WO2020/011587
PCT Pub. Date: Jan. 16, 2020

(65) Prior Publication Data
US 2021/0324167 A1 Oct. 21, 2021

(30) Foreign Application Priority Data
Jul. 10, 2018 (SE) .................... 1850873-9

(51) Int. Cl.
*C08J 9/00* (2006.01)
*C08J 9/30* (2006.01)

(52) U.S. Cl.
CPC ........... *C08J 9/0085* (2013.01); *C08J 9/0061* (2013.01); *C08J 9/30* (2013.01); *C08J 2205/05* (2013.01); *C08J 2301/02* (2013.01); *C08J 2389/00* (2013.01)

(58) Field of Classification Search
CPC ................ C08J 2205/05; C08J 2301/02; C08J 2389/00; C08J 2401/02; C08J 2489/00; C08J 9/0061; C08J 9/0085; C08J 9/30
See application file for complete search history.

(56) References Cited

U.S. PATENT DOCUMENTS

| 5,360,586 A | 11/1994 | Wyatt et al. |
| 5,643,359 A * | 7/1997 | Soroushian ........... C04B 18/241 |
| | | 106/805 |
| 2013/0113138 A1 | 5/2013 | Woerdeman |

FOREIGN PATENT DOCUMENTS

| CN | 102712108 | 10/2012 | |
| DE | 102012015539 | 5/2014 | |
| EP | 546956 A2 * | 6/1993 | ............... B32B 9/02 |
| JP | 09208714 A * | 8/1997 | |
| WO | WO 1996/14970 | 5/1996 | |
| WO | WO 1999/061518 | 12/1999 | |

(Continued)

OTHER PUBLICATIONS

Translation of JP H09208714 A, Sashita et al., Aug. 12, 1997. (Year: 1997).*

(Continued)

*Primary Examiner* — Hai Vo
(74) *Attorney, Agent, or Firm* — Fish & Richardson P.C.

(57) ABSTRACT

The present invention relates to a porous material comprising cellulose fibres and gluten, wherein the weight proportion of cellulose fibres to gluten is from 1:6 to 6:1, and wherein the porous material has a density of from 5 to 200 kg/m³ as calculated on dry porous material. The present invention also relates to a method for the preparation of the porous material, as well as its use.

14 Claims, 5 Drawing Sheets

(56) References Cited

FOREIGN PATENT DOCUMENTS

| | | |
|---|---|---|
| WO | WO 2008/096180 | 8/2008 |
| WO | WO 2013/160553 | 10/2013 |
| WO | WO 2014/011112 | 1/2014 |
| WO | WO 2015/036659 | 3/2015 |
| WO | WO 2015/171713 | 11/2015 |
| WO | WO 2016/193547 | 12/2016 |

OTHER PUBLICATIONS

Translation of EP 546956 A2, Gervason et al., Jun. 16, 1993. (Year: 1993).*
PCT International Preliminary Report on Patentability in International Appln. No. PCT/EP2019/067639, dated Janaury 21, 2021, 7 pages.
PCT International Search Report and Written Opinion in International Appln. No. PCT/EP2019/067639, dated Sep. 26, 2019, 8 pages.

* cited by examiner

A)

B)

POROUS MATERIAL OF CELLULOSE FIBRES AND GLUTEN

CROSS-REFERENCE TO RELATED APPLICATIONS

This application is a National Stage application under 35 U.S.C. § 371 of International Application No. PCT/EP2019/067639 having an International Filing Date of Jul. 1, 2019, which claims the benefit of SE Application Serial No. 1850873-9, filed on Jul. 10, 2018. The disclosures of each of these applications are incorporated herein by reference in their entireties.

FIELD OF THE INVENTION

The present invention relates to a porous material comprising cellulose fibres and gluten, wherein the weight proportion of cellulose fibres to gluten is from 1:6 to 6:1, and wherein the porous material has a density of from 5 to 200 kg/m$^3$ as calculated on the dry porous material. The present invention also relates to a method for the preparation of the porous material, as well as its use.

TECHNICAL BACKGROUND

In our everyday life, macroporous and microporous materials often made of petroleum-based polymers are used in various forms and compositions. Examples of these are insulation in buildings and airplanes, and polymeric porous material for packaging, such as polyurethane foam (PU), polyethylene foams (PE), expanded polystyrene (EPS) or expanded polypropylene (EPP). Porous materials for this type of use have to be stable, light and easy to manufacture. Due to the increased awareness of the need to use renewable materials, it is highly motivated to replace petroleum-based polymers with polymers from renewable resources. There are many challenges with finding porous materials from renewable sources especially the price and performance issue. Many bio-based porous materials have higher cost of production and lower mechanical performance, as well as poor stability in water or high temperatures, compared to established foams from oil-based sources. Removing water from thick materials requires large amount of energy and therefore the thickness of the material is often a limiting factor for water-based production of bio-based porous materials. Another advantage of oil-based porous materials except the price and performance is the naturally hydrophobic properties compared to many bio-based foams that are hydrophilic by nature.

Cellulose has a special potential, as the most abundant renewable natural polymers on earth, with its crystalline structure, and the availability of methods for preparing large volumes on an industrial scale. Cellulose based porous materials are usually produced by using a starting material of cellulose fibres water suspensions. The key issue is to remove the water without causing collapse or shrinkage during drying of the wet porous cellulose material. Several techniques can be used to keep the three-dimensional wet porous structure intact during the removal of water. One technique is achieved by freeze drying the cellulose fibre water suspension, which creates ice crystals that will support the cellulose fibres and make the removal of water possible without destroying the structure of the cellulose fibre network. The water can then be removed directly by the sublimation of the ice using freeze drying techniques or by solvent drying where an organic solvent that is miscible with water is used to replace the ice/water. These procedures create porous cellulose materials or foams with open cell structures and different densities depending on the initial cellulose water concentration.

Another technique is to create a wet cellulose foam like for example a wet cellulose foam where the gas bubbles are stabilized by the cellulose fibres together with a surfactant, which can keep the three-dimensional structure intact during drying. For this procedure, a surfactant is required to stabilize the foam. The surfactant can be of any kind, cationic, anionic, neutral or amphiphilic and the gas can be introduced to the cellulose suspension for example using mechanical mixing or beating. A successful example of using this is to use nanocellulose to further help stabilize the air bubbles. Cellulose nanofibrils (CNF) has been used to create foams with closed cell structures using this technique (WO2014/011112). The stable wet foam can then be dried using heat without a collapse of the dry foam.

A method of producing an open low-density absorbent fibrous structure of paper-making fibres and gelatine is disclosed in WO1999/061518. A rigid foam of wool or nylon fibres and gluten are disclosed in WO2008/096180. A fibrous web of paper board comprising cellulose fibres and microfibrillated cellulose is disclosed in WO2013/160553. A method for preparing a foam of cellulose fibres, hydrophobin or hydrophobin variants, and a low-molecular-weight surfactant is disclosed in WO2016/193547. WO 2015/036659 relates to a method of forming a moulded fibrous product by foaming an aqueous suspension of natural fibres.

SUMMARY OF THE INVENTION

The objective of this invention is to provide a low-cost procedure for the production of a cellulose fibre based porous material that is stable in that it does not collapse or shrink with time or during drying.

One aspect of the present invention is a porous material comprising cellulose fibres and gluten, wherein the weight proportion of cellulose fibres to gluten is from 1:6 to 6:1, and wherein the porous material has a density of from 5 to 200 kg/m$^3$ as calculated on dry porous material. Another aspect of the invention is a method for the preparation of a porous material comprising cellulose fibres and gluten, wherein the method comprises foaming of cellulose fibres and gluten in a solvent comprising water. A further aspect of the invention is the use of the porous material in packaging and cushioning applications, in heat and sound isolation, as a construction material, and for water adsorption, as well as in plant or growth media.

DETAILED DESCRIPTION OF THE INVENTION

Figure 1:
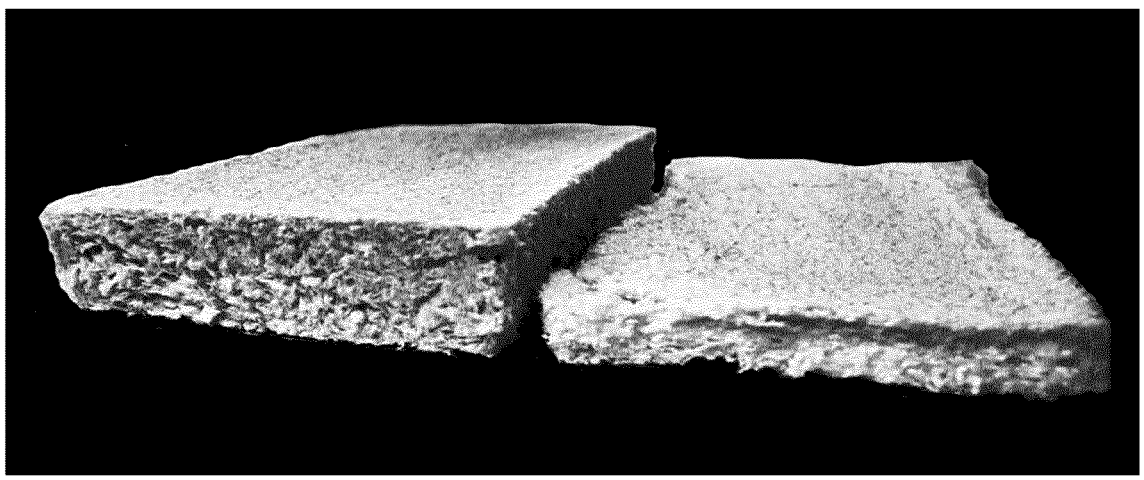
FIG. 1 shows to the left a porous material comprising cellulose fibres and gluten as binding and foaming agent, and to the right a material comprising the same cellulose fibres and egg white as the foaming and binding material. The material on the right side had a volume shrinkage of almost 50% during the drying step.

The present invention thus relates to a porous material comprising cellulose fibres and gluten, wherein the weight proportion of cellulose fibres to gluten is from 1:6 to 6:1, and wherein the porous material has a density of from 5 to 200 kg/m³ as calculated on dry porous material.

It should be noted that embodiments and/or features and/or advantages described in the context of one of the aspects and/or embodiments of the present invention may also apply mutatis mutandis to all the other aspects and/or embodiments of the invention. All words and abbreviations used in the present application shall be construed as having the meaning usually given to them in the relevant art, unless otherwise indicated. For clarity, some terms are however specifically defined below.

The term "porous material" is used herein for materials containing a solid matrix and void spaces in the form of interconnected pores. The void spaces may be filled with a liquid or gas. At least 50%, at least 70%, or at least 80%, of the total volume of the void spaces of porous material according to the present invention may comprise interconnected pores. The term "dry porous material" is used herein for a porous material that has been dried until it reaches a constant mass, wherein constant mass is the mass reached by a porous material after drying at a temperature of 105° C.±2° C. until the difference between two successive weighings, separated in time by at least 30 minutes of drying at 105° C.±2° C., does not exceed 0.1% weight difference.

The term "gluten" is used herein for a water-insoluble protein that occurs in grains of cereals and is formed from glutelin and prolamin that are cross-linked. Due to the crosslinks between glutelin and prolamin, gluten is a very elastic substance. The glutelins are protein aggregates of high-molecular-mass (HMW) and low-molecular-mass (LMW) subunits with molar masses from about 200,000 to a few million, which are stabilized by intermolecular disulphide bonds, hydrophobic interactions and other forces. The group of glutelins include glutenin from wheat, secalinin from rye, hordenin from barley, and zeanin from corn. Glutenin is the major protein within wheat flour and is insoluble in water. Prolamins are a group of plant storage proteins found in the seeds of cereal grains. The prolamins from grain include gliadin in wheat, hordein in barley, secalin in rye, zein in corn, kafirin in sorghum, and avenin in oat, and are also found in related species such as spelt, khorasan, emmer, einkorn, triticale and kamut. Gliadins are water soluble prolamins found in wheat and several other cereals within the grass genus Triticum and is a class of monomeric proteins that can be separated into four groups: alpha-, beta-, gamma- and omega-gliadins. Preferably the gluten used in the present invention is wheat gluten.

Gluten acts as an emulsifier and a foaming agent and may thus provide for the formation of a stable foam. The prolamin part of gluten accounts for the foaming properties of gluten in water. Especially the prolamin gliadin may provide good foaming properties. The glutenin part of gluten may provide elasticity to the wet porous material. By using gluten in preparation of the porous material from cellulose fibres according to the present invention, the presence of surfactants is not required. In the porous material disclosed herein gluten may also act as a binder for the cellulose fibre network. Gluten can provide viscoelastic properties to the wet porous material. An additional advantage is the ample availability of gluten together with its renewability and its low price. The use of gluten in the porous material according to the present invention, makes the presence of surfactants unnecessary. The interaction between the cellulose fibres and gluten in the porous material disclosed herein, makes the presence of further protein crosslinkers, such as glutaraldehyde, unnecessary in order to obtain a stable porous material which doesn't collapse during the drying process.

The ratio of cellulose fibres to gluten affects the properties of the final foam. In the material according to the present invention the weight proportion of cellulose fibres to gluten is from 1:6 to 6:1, from 1:4 to 6:1, from 1:5 to 5:1, from 1:4 to 5:1, from 1:4 to 4:1, from 1:2 to 4:1, from 1:3.5 to 3:1, or from 1:2 to 2:1. Preferably the weight proportion of cellulose fibres to gluten is from 1:5 to 5:1, from 1:2 to 4:1, from 1:2 to 2:1; and even more preferably from 1:2 to 2:1.

High amounts of gluten can provide brittleness and inhomogeneity to the material. The porous material according to the present material may comprise at least 8 wt % gluten, at least 12.5 wt % gluten, at least 14 wt % gluten, at least 17 wt % gluten, at least 20 wt % gluten, at least 25 wt % gluten, at least 35 wt % gluten, or at least 50 wt % gluten, as calculated on the total weight of dry porous material. The porous material according to the present material may comprise at most 85 wt % gluten, at most 80 wt % gluten, at most 75 wt % gluten, at most 70 wt % gluten, or at most 65 wt % gluten, as calculated on the total weight of dry porous material. Preferably, the material comprises at most 70 wt % gluten, as calculated on the total weight of dry porous material.

Cellulose is the main component in the cell walls of all plants. It can occur with different components depending on the type or part of the plant. In wood for example, cellulose occurs together with lignin and hemicelluloses. In leaves, the cellulose occurs lignin free but together with rich amount of hemicelluloses. In the seed hairs of cotton, cellulose occurs in almost pure forms, free of lignin. The cellulose fibres suitable in the porous material according to the present invention can originate from wood, such as softwood or hardwood, from leaves or from fibre crops (including cotton, flax and hemp). The cellulose fibres suitable in the porous material according to the present invention can originate also from regenerated cellulose such as rayon and Lyocell. The cellulose fibres used in the present invention may include lignin or hemicellulose or both, or the cellulose fibres may be free from lignin and hemicellulose. Preferably the cellulose fibres originate from wood, more preferably the cellulose fibres are pulp fibres obtained by pulping processes which liberates the fibres from the wood matrix. Pulp fibres can be liberated by mechanical pulping, obtaining mechanical pulp such as thermo mechanical pulp (TMP) or chemo thermo mechanical pulp (CTMP), or by chemical pulping such as Kraft pulp or pulps obtained by the sulphite process, soda process or organosolv pulping process. More preferably, the cellulose fibres are pulp fibres liberated by chemical pulping processes. The different characteristic of each cellulose will affect the properties of the final porous material. A cellulose fibre is significantly longer than it is wide. Cellulose fibres can have a mean width of 0.01 to 0.05 mm. The fibre length of softwood can be from 2.5 to 4.5 mm, while hardwood can have a fibre length from 0.7 to 1.6 mm, and *Eucalyptus* from 0.7 to 1.5 mm. However, the fibre length can vary considerably with different growing place, etc. The cellulose fibres in the porous material disclosed herein can have a length from 0.1 mm to 65 mm, from 0.1 mm to 10 mm, or 0.5 mm to 65 mm, or from 0.5 mm to 10 mm, or from 0.5 mm to 7 mm. The fibre lengths may provide different mechanical characteristics to the material. Due to the length of fibres, they can entangle with each other and impart fibre to fibre interbonds that bring strength to the foam structure. The aspect ratio, i.e. the ratio of the fibre length to the fibre width, of the cellulose fibres in the porous material according to the present invention can be at least 10, at least 25, at least 50, at least 75, or at least 100, which provides for preservation and stabilization of the foam structure during the drying procedure, making it possible to dry the wet foam in a conventional oven without a collapse of the porous structure. The aspect ratio can be up to 6500, or preferably up to 2000.

The cellulose fibres may be modified to provide different properties to the final porous material. For example, phosphorylated fibres or periodate oxidized fibres could also be used when producing a porous material according to the present invention. The porous material according to the present invention may comprise at least 8 wt %, at least 12 wt %, at least 14 wt %, at least 17 wt %, at least 20 wt %, at least 25 wt %, at least 30 wt %, at least 40 wt %, at least 50 wt %, at least 55 wt %, at least 60 wt %, or at least 65 wt %, cellulose fibres, as calculated on the total weight of dry porous material. The porous material according to the present material may comprise at most 85 wt % cellulose fibres, at most 80 wt % cellulose fibres, at most 75 wt % cellulose fibres, or at most 70 wt % cellulose fibres as calculated on the total weight of dry porous material. Preferably, the material comprises at most 80 wt % cellulose fibres, as calculated on the total weight of dry porous material.

The porous material may comprise additional ingredients such as preservatives, flame retardants, hydrophobic agents or other chemicals that can introduce additional desired properties to the porous material without causing a disruption of the foaming or drying that may result in a collapse of the structure or a volume shrinkage during the drying process. Examples of such additives are waxes, such as carnauba wax, beeswax or alkenyl ketene dimer (AKD); microcrystalline cellulose; cellulose nanomaterials, such as cellulose nanocrystals, microfibrillated cellulose, or nanofibrillated cellulose; synthetic cellulose derivatives, such as methylcellulose, or hydroxyethyl cellulose; hemicelluloses, such as xyloglucan, xylan galactomannans, or galactoglucomannans; other polysaccharides, such as starch and modified starches; poly vinyl acetate (PVAc); poly vinyl alcohol (PVOH); chitosan; preservatives such as calcium propionate and potassium sorbate; and oils, such as rapeseed oil, or castor oil. Preferred additives are AKD and xyloglucan. The porous material according to the present material may be obtained from only gluten, cellulose fibres and water without other ingredients.

Interfibre bonding plays an important role in the strength of the porous material obtained according to the present invention. Liberated pulp fibres have a higher aspect ratio than wood chips or other wood particulates such as wood flour, and this higher aspect ratio provides for an increase in the bonding strength between the fibres and allows for the preparation of porous materials with low density (i.e. under 50 kg/m$^3$) but with good strength and mechanical properties. Wood particles may act as stress raisers rather than load-carrying fibres. Moreover, the mechanical entanglement between opposing surfaces obtained by using cellulose fibres determines the strength of the bonded joint between the fibres.

The porous cellulose fibre material can have a thickness larger than 0.5 cm, such as 0.5 to 50 cm, 0.5 to 20 cm, or 1 to 10 cm. The porous material according to the present invention may have a density from 5 to 200 kg/m$^3$ dry porous material; from 5 to 150 kg/m$^3$, from 5 to 100 kg/m$^3$; from 5 to 70 kg/m$^3$, from 5 to 50 kg/m$^3$, from 8 to 200 kg/m$^3$; from 8 to 150 kg/m$^3$, from 8 to 100 kg/m$^3$; from 8 to 70 kg/m$^3$, or from 8 to 50 kg/m$^3$, from 20 to 200 kg/m$^3$, from 20 to 150 kg/m$^3$, from 20 to 100 kg/m$^3$, from 20 to 70 kg/m$^3$, or from 30 to 70 kg/m$^3$ dry porous material. Preferably the material has a density from 20 to 200 kg/m$^3$, from 20 to 150 kg/m$^3$, from 20 to 100 kg/m$^3$, from 20 to 70 kg/m$^3$, or from 30 to 70 kg/m$^3$ dry porous material. A material with a lower density can have a looser structure and different mechanical properties than a higher density material of the same composition, since less amounts of cellulose fibres and gluten are present per unit of volume in the material with lower density. The density of the porous material is calculated with the equation (1):

$$\text{Density} = \frac{m}{V} \quad (1)$$

where, density is the density of the dry porous material in kg/m$^3$, m is the mass of a piece of the dry porous material in kg, and V is the volume of said piece of dry porous material in m$^3$.

The method for preparing the porous material comprising cellulose fibres and gluten according to the present invention, comprises foaming cellulose fibres and gluten in a solvent comprising water, preferably water, wherein the weight proportion of cellulose fibres to gluten is from 1:6 to 6:1. The obtained porous material may be used as a wet porous material without further drainage or drying. However, the porous material may be subsequently dried to obtain a dried porous material with essentially the same dimensions as the porous material before drying, i.e. without shrinking, such as less than 20%, or less than 15%, or less than 10%, reduction in volume. Viscoelastic properties of gluten in wet form, such as when suspended in an aqueous solvent, promotes trapping of air bubbles within the wet porous material of cellulose fibres and gluten. The viscoelastic properties of gluten also promote the stability of the wet porous material before drying and prevents the porous material from collapsing when it is dried. The use of gluten enables storage, such as for several days, of a mixture comprising cellulose fibres and gluten in water, that can be foamed at a later stage. Further, a foamed mixture of cellulose fibres and gluten in water, i.e. a wet porous material, can be stored for days before it is dried.

In one embodiment of method according to the present invention, a mixture of cellulose and gluten in water is formed before foaming the mixture. The mixture may comprise from 1:6 to 6:1, from 1:4 to 6:1, from 1:5 to 5:1, from 1:4 to 5:1, from 1:4 to 4:1, from 1:2 to 4:1, from 1:3.5 to 3:1, or from 1:2 to 2:1, per weight of cellulose fibres to gluten. The mixture may be obtained by mixing a cellulose fibre suspension, for example a Kraft pulp fibre suspension, and adding gluten. The cellulose fibre suspension can be achieved by first soaking dry cellulose fibres from a source in hot or cold water followed by mixing using standard cellulose disintegration apparatuses for defibrillation. In a laboratory a Vitamixer or a Kenwood mixer may also be used. The cellulose suspension may have a concentration of from 1-40 wt %, or 1-30 wt %, or 2-20 wt % or 4-17 wt % cellulose fibres in a solvent comprising water, preferably water, as calculated on the total weight of the cellulose suspension. Gluten may be added to the cellulose suspension as a powder or as an admixture obtained by pre-mixing gluten with a solvent comprising water, preferably water.

The gluten admixture may have a concentration of from 1-40 wt % or 1-30 wt % or 1-20 wt % gluten in water, as calculated on the total weight of the gluten admixture. The cellulose suspension is mixed with the added gluten in a solvent comprising water, preferably water, to form a mixture of cellulose and gluten in solvent with concentration 1-40 wt %, or 1-30 wt %, or 1-20 wt %, or 3-20 wt %, or 5-40 wt %, or 5-20 wt %, or 10-40 wt % or 10-20 wt % of solid content. An advantage with using higher amount of solid content is that less amounts of solvent have to be evaporated when the material is dried. After mixing the cellulose suspension with gluten, foaming is performed by introducing a gas into the mixture. Several different techniques for the introduction of a gas is possible and for an industrial scale a continuous procedure is preferable. Foaming, i.e. introducing a gas, may be made by mechanical stirring or whipping or beating of the mixture or by direct introduction of a gas, such as air, nitrogen or carbon dioxide, preferably air, into the mixture. The gas could be introduced by for example pressurising the mixture with the gas. By releasing the pressure, the mixture will be foamed. The air content can be adjusted by the whipping speed and or the type and time of stirring. High amount of gas or air can be introduced to the mixture and the volume can increase up to several hundred percent, such as more than 200%, or even up to 1000% or more. The concentration of the cellulose and gluten in the mixture may affect the amount of gas or air that can be introduced.

In an alternative embodiment of the method according to the present invention a foam of gluten in a solvent comprising water, preferably water, is formed before a suspension of cellulose fibres is added to the foam. The gluten foam may be made by mechanical mixing or whipping and may have a concentration of from 1-40 wt %, or 1-30 wt %, gluten, as calculated on the total weight of the gluten foam. A cellulose suspension can be provided by first soaking dry cellulose fibres in a hot or cold solvent comprising water, preferably water, followed by mixing using standard cellulose disintegration apparatuses. In a laboratory a Vitamixer or a Kenwood mixer may be used. The cellulose fibre suspension may have a concentration of from 1-40 wt %, or 1-30 wt %, or 2-20 wt %, or 4-17 wt % cellulose fibres in water as calculated on the total weight of the cellulose suspension. The cellulose suspension is then mixed with the gluten foam to form a wet porous material comprising cellulose, gluten and a solvent comprising water, preferably water, with a solid content of 1-40 wt %, or 1-30 wt %, or 1-20 wt %, or 3-20 wt %, or 5-20 wt % or 5-40 wt %, or 10-40 wt % or 10-20 wt % in water.

Cellulose fibres tend to flocculate and it is therefore advantageous to provide a well suspended mixture of cellulose fibres and gluten before air is introduced for foaming the mixture. Foaming augments separation of the cellulose fibres in the suspension, which enables multiple fibre to fibre interbondings between cellulose fibres. The fibre interbonding stabilizes the foam and provides strength and structure to the material. In a low-foaming mixture with few bubbles, the cellulose fibres remain in bundles of fibres to a larger extent with no or a very low degree of fibre to fibre interbonding. With gluten acting as a foaming agent, the ratio of cellulose fibres to gluten also affects the degree of flocculation and separation of the cellulose fibres. In suspensions containing gluten without cellulose fibres, the gluten may crosslink with itself when the concentration of gluten is high, because of too vigorous mixing, or by the occurrence of ions or impurities in water, which may prevent foaming. Mixing cellulose fibres with gluten before foaming permits a higher concentration of gluten and cellulose fibres in the wet porous material and less amounts of water have to be removed to dry the porous material.

The wet porous material may be dried until the porous material comprises less than 15 wt %, or less than 10 wt % water. The first step of the removal of water may be drainage. The drainage can either be facilitated by gravitation or by vacuum, which will further increase the drainage speed. The residual water may be evaporated by subjecting the wet porous material to an elevated temperature, such as a temperature above 20° C., for example from 25 to 150° C., from 50 to 100° C., or from 50 to 125° C. or from 50 to 150° C. Alternatively, the drainage of water and heat drying can be made at the same time. Different ovens such as baking ovens, curing ovens, drying ovens or industrial batch and continuous ovens can be used. The use of microwaves or a combination of microwaves and heat flow in order to heat the porous material from inside can further speed up the drying time. Depending on the stability of the porous material also lower and higher temperatures may be used. A too high temperature can make the porous material inhomogeneous or even damage the materials. The drying temperature can also be changed during the drying for example a lower initial temperature can be used with an increase over time. The water may also be removed by solvent exchange, for example with ethanol. The water can also be removed first by drainage and then the remaining moist porous material can be collected and used later to fill moulds or shapes in order to obtain porous materials with a certain shape after the final drying. It is an advantage with the method according to the present invention that only moderate heating, or even no heating, is required to obtain the porous material. Gluten provides for stability and keeping the air trapped inside of the porous material during the drying. This is obtained without the use of surfactants. The gluten may act as a binder for the cellulose fibre network in the porous material. Thus, the use of gluten prevents the porous material from shrinking and collapsing during drying. Dried porous material according to the present invention may absorb water again if it is in a humid environment.

Different additives can be introduced to the cellulose-gluten mixture or to the wet porous material to introduce different desired properties, like for example to increase the hydrophobicity of the porous material. Examples of additives are preservatives, flame retardants or chemicals, for example waxes, such as carnauba wax, beeswax or alkenyl ketene dimer (AKD); microcrystalline cellulose; cellulose nanomaterials, such as cellulose nanocrystals, microfibrillated cellulose, or nanofibrillated cellulose; synthetic cellulose derivatives, such as methylcellulose, or hydroxyethyl cellulose; hemicelluloses, such as xyloglucan, xylan galactomannans, or galactoglucomannans; other polysaccharides, such as starch and modified starches; poly vinyl acetate (PVAc); poly vinyl alcohol (PVOH); chitosan; preservatives such as calcium propionate and potassium sorbate; and oils, such as rapeseed oil, or castor oil. Preferred additives are AKD and xyloglucan. These additives can be introduced already to the wet state to avoid more complicated post modifications of dried porous materials. This results also in a more homogenous distribution of the chemicals within the porous material compared to most post-modifications of already dried porous material that can lead to surface modification only. Some additives may have an impact on the drainage and drying. The porous material can be made hydrophobic by using a wax, for example AKD (alkenyl ketene dimer). Introducing wax as a powder or emulsion to the foaming mixture has the advantage that it may avoid collapse of the porous structure. Collapse of the porous structure could otherwise occur when using an oil or melted wax. The water can be removed by heat at lower temperatures, for example at about 70° C., and at the end of the drying procedure the temperature can be increased to melt the wax and to make the dried porous material hydrophobic. This approach gives hydrophobicity evenly distributed within the porous material, from the outside to the inside. Alternatively, hydrophobic properties can be obtained without addition of additives by subjecting the porous material to at least 150° C., preferably for a short period of time.

The method according to the present invention enables the production of dried porous light weight material from cellulose fibres with cellulose, water, air and gluten. The obtained porous materials are biodegradable, and the ingredients are renewable. The wet porous materials can be dried directly after foaming and the volume of the material is maintained, i.e. there is no or only minimal shrinkage, such as less than 20% reduction in volume, or less than 15% reduction in volume, or less than 10% reduction in volume, during drainage and drying. Further, the method provides for a low-cost process, since the starting materials, cellulose fibres, gluten, water and air are low cost materials. The wet porous material achieved with the method according to the present invention also has a high solids content which implies that only low amounts of water have to be removed to dry the porous material. Water can be drained directly after the foaming is completed to obtain moist porous materials, which implies that less energy is required for drying. Heat drying of the wet porous materials may be made without the need of freeze drying or organic solvent drying. The density of the porous materials can be controlled by the amount of air introduced to the wet material. Additives may also affect the density of the final material. The porous material can easily be made hydrophobic with the help of AKD or just by simple heat treatment of the cellulose fibre and gluten porous material.

The wet porous materials according to the present invention can be dried in high thickness without shrinkage or creation of air pockets within the dried material. The method according to the present invention enables the production of thick porous cellulose fibre materials, such as a porous material with a thickness of up to 20 cm or thicker. Preferably, the method according to the present invention enables the production of porous cellulose fibre materials with a thickness larger than 0.5 cm, such as 0.5-50 cm, 0.5 to 20 cm, or 1 to 10 cm.

The ingredients and procedure according to the present invention allow production of porous materials of different size and controlled dimensions. The wet porous material can be used to fill moulds with desired dimensions. The moulds are filled with the corresponding wet porous material or a moist porous material before drying to obtain a dried porous material. The mould may allow for drainage of excess water before drying. During drying the water should preferably be able to evaporate from as many directions as possible, for example from the opposite sides of the mould, such as the top and bottom.

Porous materials according to the present invention can be used in packaging and cushioning applications, in heat and sound isolation, as a construction material, and for water adsorption, as well as in plant or growth media. The present invention also relates to use of the porous material in an application selected from one or more of a packaging material, a cushioning material, a heat insulation material, a sound isolation material, a construction material, and a material for water adsorption, and, as well as in plant or growth media. The porous material according to the present invention has a good wet strength and may be used soaked in a liquid, such as water, which may fill the interconnected pores of the material with said liquid. Soaking the porous material in an aqueous liquid makes its advantageous beneficial as a plant or growth media. Thus, the present invention also relates to the porous material soaked in a liquid, as well as use of the porous material soaked in a liquid.

EXAMPLES

Porous materials according to the present invention and their preparation are illustrated in the following examples. Calculation of Volume Increase of the Wet Porous Material:

The volume increase of the wet porous material is calculated by the equation (2):

$$\text{Volume increase } (\%) = \frac{V_f - V_0}{V_0} \times 100 \qquad (2)$$

where $V_0$ is the initial volume in ml of the wet material before air is introduced to the mixture and $V_f$ is the final volume in ml of the wet porous material after air is introduced to the mixture. This way, if a mixture has an initial volume of 250 ml, and air is introduced to the mixture until its final volume becomes 750 ml, then the volume increase is 200%. Using the same equation, the final volume ($V_f$) can be calculated for a desired volume increase for a known initial volume ($V_0$).

Example 1

Method to prepare a dried porous material with hot DI water and gluten as a powder 60 g cellulose fibres (bleached softwood Kraft pulp fibres with 5 wt % water content) were suspended in 1300 g hot deionized (DI) water (80-100° C.) using a Vitamixer at the highest speed for 1 min. 30 g of wheat gluten (Lantmännen) was added as a powder to the cellulose fibres suspension followed by mixing using a Vitamixer at the highest speed for 1 minute until a homogenous mixture is obtained. The mixture was then cooled to room temperature. The mixture was then transferred to a kitchen mixer in our case a Kenwood Chef XL Titanium equipped with a wire whisk. Air was introduced to the mixture by mechanical whipping at the highest speed until the desired volume increase was reached (see Table 1). After the foaming was completed the obtained wet porous material was put into a mould (27 cm*37 cm*4.5 cm) where the bottom part is a water permeable net, filter, membrane etc. This allows the water to be drained from underneath the porous material. The wet porous material was evenly applied to the mould and the surface layer of the wet porous material was made even using a spackle. The wet porous material was then allowed to stand between 10-20 minutes at 20° C., for drainage of water through the permeable filter or net below the wet porous material. After this drainage, the wet porous material was dried at 70° C. over-night using a regular drying oven with air flow. The different porous materials prepared this way (table 1) did not present any significant volume shrinkage during the drainage, nor during the drying. All samples gave homogeneous porous materials. Sample 4 exhibited a lower cohesive strength than Samples 1, 2 and 3.

TABLE 1

| Sample | Cellulose fibres (g) | Gluten (g) | Water (g) | Volume increase (%) | Density of dried porous material (kg/m³) |
|---|---|---|---|---|---|
| 1 | 60 | 30 | 1300 | 50 | 70 |
| 2 | 60 | 30 | 1300 | 100 | 50 |
| 3 | 60 | 30 | 1300 | 200 | 30 |
| 4 | 60 | 30 | 1300 | 800 | 11 |

Figure 5:
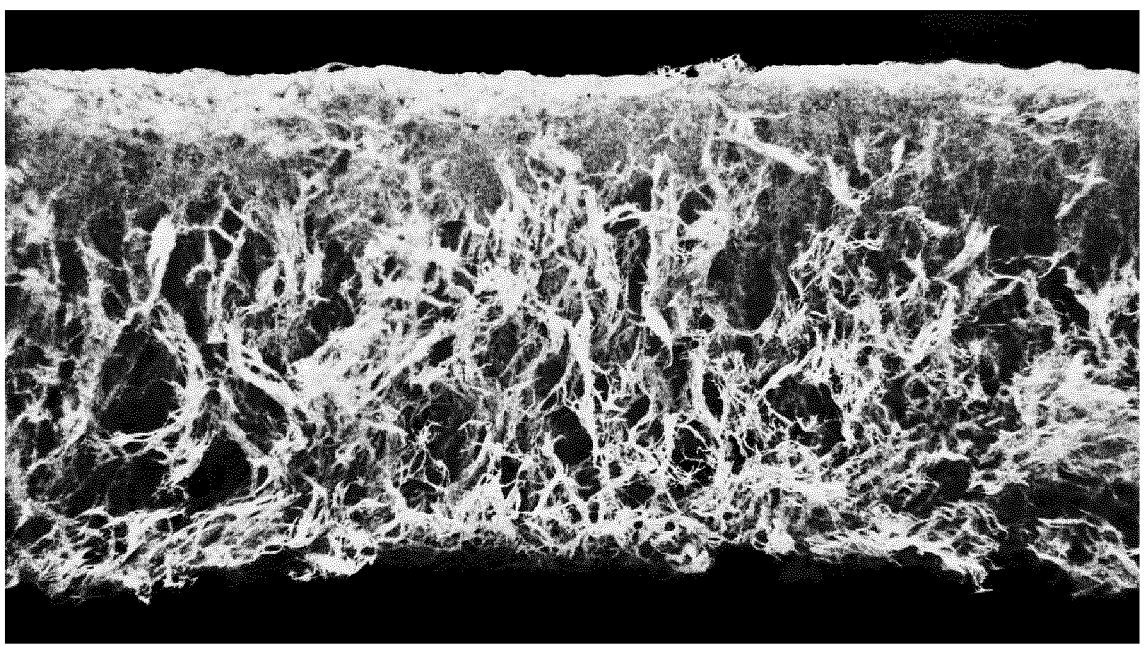
FIG. 5 shows a cross section of a porous material comprising cellulose fibres and gluten with a ratio 2:1 and a density of 11 kg/m³.
Figure 7:
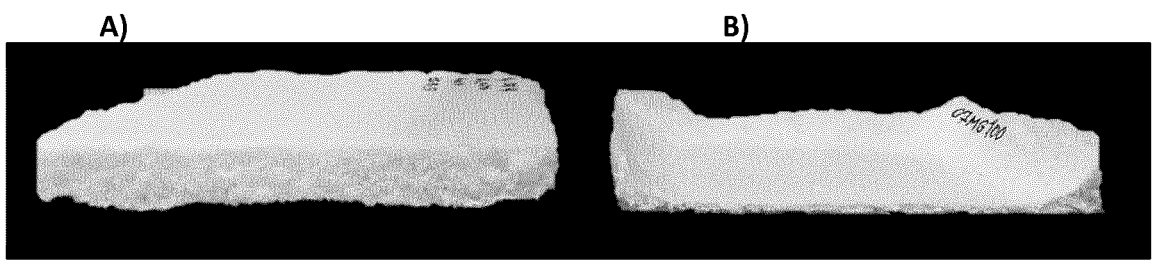
FIG. 7 shows (a) a material with a density of 11 kg/m³ prepared with cellulose fibres and gluten, and (b) a collapsed material prepared from cellulose fibres and casein.

A cross-section of sample 4 in Table 1 is shown in FIG. 5 and in FIG. 7a).

Example 2

Method to Prepare a Dried Porous Material Using an Admixture of Gluten 150 g cellulose fibres (bleached softwood Kraft pulp fibres with 5 wt % water content) were wetted in 750 g tap water followed by mixing using a Kenwood Chef XL Titanium equipped with a K beater. 150 g of wheat gluten was pre-mixed with 750 g of tap water using a Vitamixer until a homogenous suspension was obtained. The gluten suspension was then added to the cellulose fibre suspension during mixing. Air was introduced to the mixture of gluten and cellulose fibres by mechanical whipping in the Kenwood Chef XL Titanium equipped with a wire whisk until a volume increase of 300% was reached. The obtained wet porous material was then evenly applied to a mould (27 cm*37 cm*4.5 cm) having a net at the bottom allowing excess water to drain, and the upper surface layer of the wet porous material was made even using a spackle. The wet porous material was then dried at 80° C. over-night using a regular drying oven with air flow. The resulting dried porous material had a density of about ~50 kg/m³ and did not present any volume shrinkage or collapse of the structure during the drying process. The material is shown to the left in FIG. 1.

Example 3

Drying Temperature 60 g cellulose fibres (bleached softwood Kraft pulp fibres with 5 wt % water content) were suspended in 600 g tap water using a Vitamixer at the highest speed for 1 minute. 30 g of wheat gluten (Lantmännen) was added as a powder to the cellulose fibre suspension followed by mixing using a Vitamixer at the highest speed for 1 minute until a homogenous suspension was obtained. The mixture was then transferred to a Kenwood Chef XL Titanium equipped with a wire whisk. Air was introduced to the mixture by mechanical whipping at the highest speed until a volume increase of 200% was reached. When the desired volume increase was reached, the obtained wet porous material was put into a mould having a net at the bottom allowing excess water to drain, and the upper surface layer of the wet porous material was made even using a spackle. The drying temperature was investigated according to Table 2. Six samples of wet porous material were prepared as described above and were dried in a convection oven (Memmert, UF 110), with the maximum air flow at different temperatures until dried (see Table 2). The porous materials dried with temperatures up to 150° C. (sample 1 to 5) presented a homogeneous structure with no volume shrinkage during the drying process. However, the volume of the porous material increased when the porous material was dried at 170° C. This swelling effect was not observed for the lower temperatures. Too high temperature (170° C.) during the drying caused inhomogeneity in the porous materials.

TABLE 2

| Sample | Cellulose fibre (g) | Water (g) | Gluten (g) | Volume increase (%) | Drying temp (° C.) | Density of dried porous material (kg/m³) |
|---|---|---|---|---|---|---|
| 1 | 60 | 600 | 30 | 200 | 70 | 43 |
| 2 | 60 | 600 | 30 | 200 | 90 | 43 |
| 3 | 60 | 600 | 30 | 200 | 110 | 43 |
| 4 | 60 | 600 | 30 | 200 | 130 | 43 |
| 5 | 60 | 600 | 30 | 200 | 150 | 43 |
| 6 | 60 | 600 | 30 | 200 | 170 | — |

Example 4

Different Ratios of Cellulose Fibre to Gluten

The weight proportion of cellulose fibres to gluten (cellulose:gluten) was investigated according to Table 3. Samples of porous materials with different cellulose:gluten ratios were prepared following the methodology described below and with the ingredients and the volume increase as specified in Table 3. The total amount of water used during the preparation of the porous materials was 800 g and all the different materials were foamed to a volume increase of 200%. The methodology for the preparation of the porous materials was as follows (using sample 6 from Table 3 as an example): 60 g cellulose fibres (bleached softwood Kraft pulp fibres with 5 wt % water content) were suspended in 800 g tap water using a Vitamixer at the highest speed for 1 min. 25 g of wheat gluten (Lantmännen) was added as a powder to the cellulose fibres suspension followed by mixing using a Vitamixer at the highest speed for 1 minute until a homogenous mixture is obtained. The mixture was then transferred to a Kenwood Chef XL Titanium equipped with a wire whisk. Air was introduced to the mixture by mechanical whipping at the highest speed until the desired volume increase of 200% was reached. After the foaming was completed the obtained wet porous material was put into a mould where the bottom part is a water permeable net, filter, membrane etc. This allows the water to be drained from underneath the porous material. The wet porous material was evenly applied to the mould and the surface layer of the wet porous material was made even using a spackle.

Samples 1 and 2 did not increase in volume (i.e. the material did not foam) when air was introduced using a Kenwood Chef XL Titanium equipped with a wire whisk and therefore 2 ml of surfactant (Yes (in UK: Fairy (brand)), a liquid manual dish washing detergent by Procter & Gamble comprising 5-20% anionic surfactants, 5-15% non-ionic surfactants, methylisothiazolinone, phenoxyethanol, and perfume) diluted to 50% wt with water, was added to be able to obtain a volume increase similar to the rest of the samples in Table 3. All the porous materials were dried at 80° C. over-night using a regular drying oven with air flow.

TABLE 3

| Sample | Cellulose fibres (g) | Water (g) | Gluten (g) | Cellulose: gluten ratio* | Volume increase (%) | Density of dried porous material (kg/m³) | Appearance of dried porous material |
|---|---|---|---|---|---|---|---|
| 1** | 60 | 800 | 0 | 0.0 | 200 | 23 | Low stability |
| 2** | 60 | 800 | 5 | 11.4:1 | 200 | 25 | Low stability |
| 3 | 60 | 800 | 10 | 5.7:1 | 200 | 27 | Stable |
| 4 | 60 | 800 | 15 | 3.8:1 | 200 | 28 | Stable |
| 5 | 60 | 800 | 20 | 2.8:1 | 200 | 30 | Stable |
| 6 | 60 | 800 | 25 | 2.3:1 | 200 | 32 | Stable |
| 7 | 60 | 800 | 30 | 1.9:1 | 200 | 33 | Stable |
| 8 | 50 | 800 | 40 | 1.2:1 | 200 | 33 | Stable |

TABLE 3-continued

| Sample | Cellulose fibres (g) | Water (g) | Gluten (g) | Cellulose: gluten ratio* | Volume increase (%) | Density of dried porous material (kg/m$^3$) | Appearance of dried porous material |
|---|---|---|---|---|---|---|---|
| 9 | 40 | 800 | 50 | 1:1.3 | 200 | 33 | Stable |
| 10 | 30 | 800 | 60 | 1:2.1 | 200 | 33 | Stable |
| 11 | 20 | 800 | 70 | 1:3.7 | 200 | 33 | Stable |
| 12 | 10 | 800 | 90 | 1:9.5 | 200 | — | Brittle and inhomogeneous material |

Figure 2:
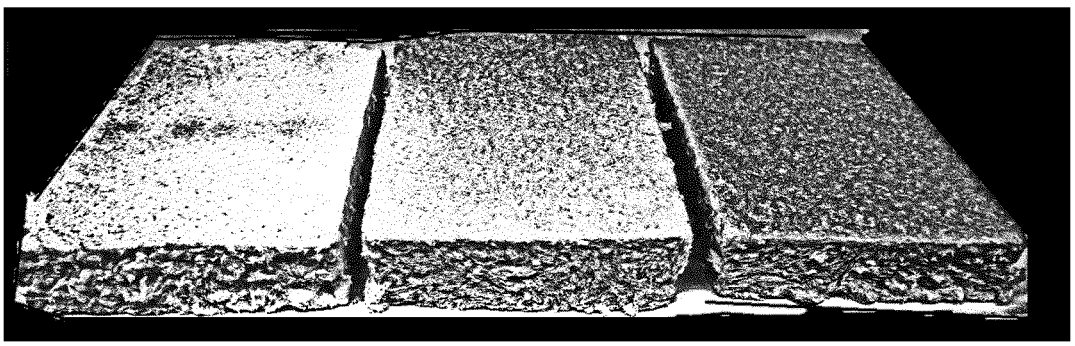
FIG. 2 shows three pieces of porous materials comprising cellulose fibres and gluten with weight ratios of 6:1 (left), 1.2:1 (middle) and 1:2 (right). None of the porous materials had a significant volume decrease during the drying.
Figure 3:
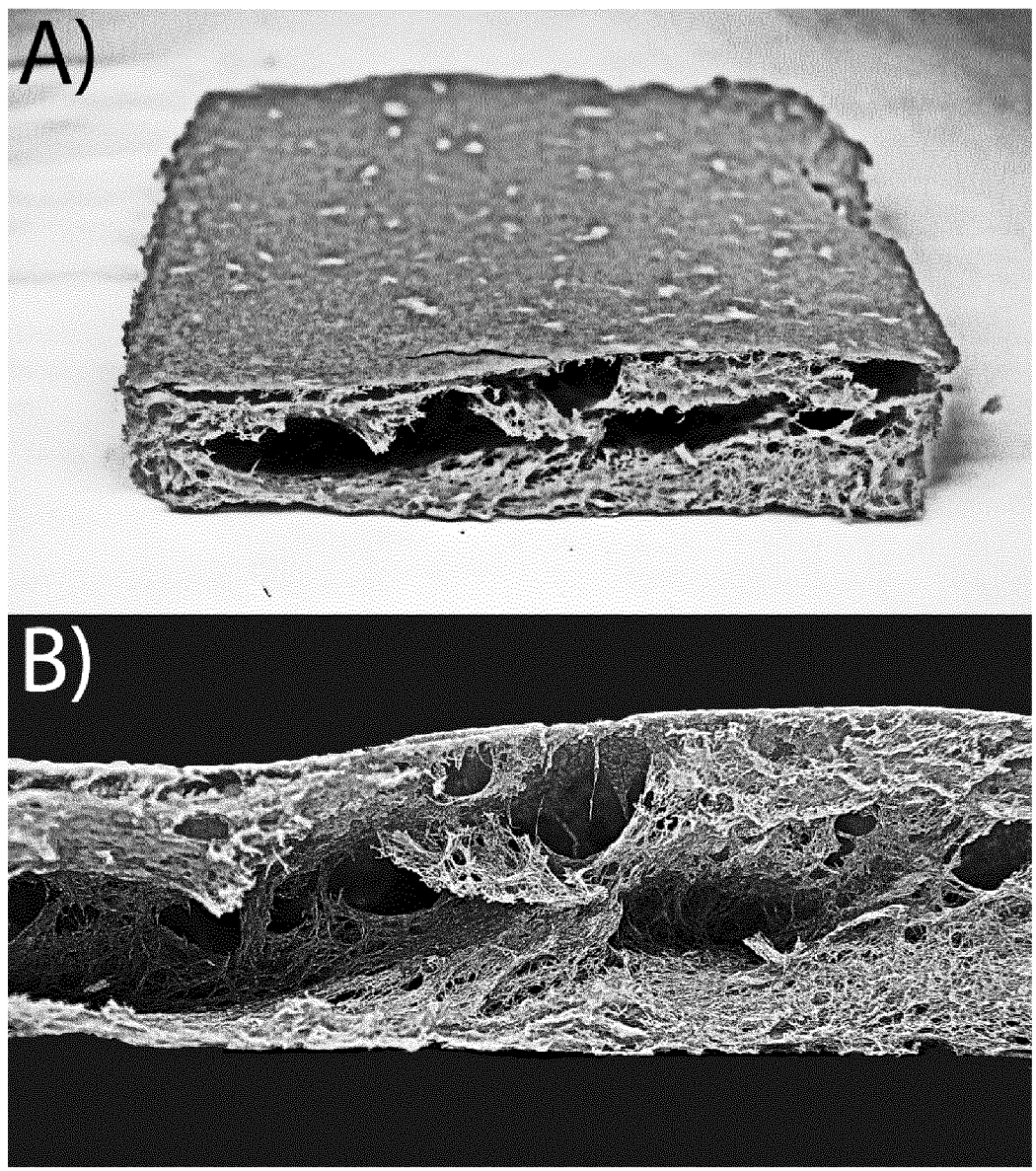
FIG. 3a) shows a top view and 3b) shows a cross-section of a material comprising cellulose fibres and gluten in a weight proportion of 1:9.

*The cellulose:gluten ratios are calculated with respect to the dry cellulose content (i.e. haying into account that the cellulose fibres had a 5 wt % water content)
Sample 1 and 2 were prepared with the aid of surfactants The dried porous material obtained from samples 3-11 felt relatively stiff with a stable (i.e. non-collapsing) and a homogeneous structure. As a result of the good structural and mechanical properties that these samples presented, they could be cut in different sizes with for example a saw, a knife or a cutter. The dried material obtained from samples 1-2 had a much worse structural stability resembling more an unbounded cellulose fibres network which had to be handled with care to not fall apart due to their poor mechanical properties. Sample 12 was very brittle and inhomogeneous, presenting big holes and cavities in the structure. The density of sample 12 was not possible to be calculated. Samples 3, 8 and 10 are shown in FIG. 2 (5.7:1 (left), 1.2:1 (middle) and 1:2.1 (right)). Sample 12 is shown in FIGS. 3a (top view) and 3**b (cross section) where the big holes and cavities can be seen in the structure.

Example 5

Preparation of Hydrophobic Porous Material with AKD

AKD was introduced directly to the foaming (i.e. air introduction by mechanical whipping) procedure, either as an emulsion or as a powder. The later was eventually preferred because it simplicity. 60 g of cellulose fibres (bleached Kraft softwood pulp fibres with 5 wt % water content) were wetted in 300 g deionized water followed by suspension using a Kenwood Chef XL Titanium equipped with a K beater. 60 g of gluten was first suspended in 300 g deionized water using a Vitamixer until a homogenous suspension was obtained and then transferred to the pulp mixture. The AKD powder (as specified in Table 4) was then introduced to the mixture followed by foaming of the mixture using a Kenwood Chef XL Titanium equipped with a wire whisk to the desired volume increase, which in this case was 300%. The wet porous material obtained this way was evenly applied to a mould having a net at the bottom, and the surface layer of the wet porous material was made even using a spackle. The drying was first performed at lower temperatures (i.e. 60° C.) to avoid melting of the AKD that causes shrinkage of the wet porous material. At the end of the drying the temperature was increased to 100° C. in order to melt the AKD and make the fibres hydrophobic. This way the porous materials obtained did not present any significant volume shrinkage while presenting hydrophobic properties evenly distributed for the whole porous material, from the outside to the inside. The results are presented in Table 4.

TABLE 4

| Sample | Cellulose fibres (g) | Water (g) | Gluten (g) | Volume increase (%) | AKD (g) | Density of dried porous (kg/m$^3$) | Hydrophobicity material |
|---|---|---|---|---|---|---|---|
| 1 | 60 | 600 | 60 | 300 | 0 | 42 | no |
| 2 | 60 | 600 | 60 | 300 | 5 | 43 | slightly |
| 3 | 60 | 600 | 60 | 300 | 10 | 45 | yes |
| 4 | 60 | 600 | 60 | 300 | 20 | 47 | yes |
| 5 | 60 | 600 | 60 | 300 | 30 | 50 | yes |
| 6 | 60 | 600 | 60 | 300 | 40 | 53 | yes |

Example 6

Hydrophobic Heat-Treated Porous Materials

Samples of wet porous material were prepared following the methodology described below with the amount of gluten and cellulose fibres as specified in Table 5. The total amount of water used during the preparation of the wet porous materials was 1500 g, where 750 g was used to suspend the cellulose fibres and 750 g was used to prepare the gluten suspension. The methodology for the preparation of the porous materials was as follows (using sample 2 from Table 5 as an example): 150 g cellulose fibres (bleached softwood Kraft pulp fibres with 5 wt % water content) were wetted in 750 g tap water followed by mixing using a Kenwood Chef XL Titanium equipped with a K beater. 75 g of wheat gluten was pre-mixed with 750 g of tap water using a Vitamixer until a homogenous suspension was obtained. The gluten suspension was then added to the cellulose fibre suspension during mixing. Air was introduced to the mixture of gluten and cellulose fibres by mechanical whipping in the Kenwood Chef XL Titanium equipped with a wire whisk until a volume increase of 300% was reached. The obtained wet porous material was then evenly applied to a mould (27 cm*37 cm*4.5 cm) having a net at the bottom allowing excess water to drain, and the upper surface layer of the wet porous material was made even using a spackle. The wet porous material was then dried at 80° C. over-night using a regular drying oven with air flow. After that, a second heat treatment was performed at 150° C. for 3 h in order to give hydrophobic properties to the dried porous material. The mechanical properties were maintained after the heat treatment at 150° C. but the porous materials became brown, especially on the surface. The more gluten present in the composition the greater browning effect. The hydrophobicity was observed even at low gluten levels as seen in Table 5.

TABLE 5

| Sample | Cellulose fibres (g) | Gluten (g) | Water (g) | Volume increase (%) | Density of dried porous material (kg/m³) | Final drying temp (° C.) | Hydrophobicity |
|---|---|---|---|---|---|---|---|
| 1 | 150 | 45 | 1500 | 300 | 29 | 150 | yes |
| 2 | 150 | 75 | 1500 | 300 | 33 | 150 | yes |
| 3 | 150 | 150 | 1500 | 300 | 42 | 150 | yes |

Example 7

Different Cellulose Fibres

Porous materials were prepared following the methodology described below but with the type of cellulose fibres as specified in Table 6. The methodology for the preparation of the porous materials was as follows (using sample 2 from Table 6 as an example): 60 g cellulose fibres (bleached softwood Kraft pulp fibres) were suspended in 600 g tap water using a Vitamixer at the highest speed for 1 min. 30 g of wheat gluten (Lantmännen) was added as a powder to the cellulose fibres suspension followed by mixing using a Vitamixer at the highest speed for 1 minute until a homogenous mixture is obtained. The mixture was then transferred to a Kenwood Chef XL Titanium equipped with a wire whisk. Air was introduced to the mixture by mechanical whipping at the highest speed until the desired volume increase of 200% was reached. After the foaming was completed the obtained wet porous material was put into a mould where the bottom part is a water permeable net, filter, membrane etc. This allows the water to be drained from underneath the porous material. The wet porous material was evenly applied to the mould and the surface layer of the wet porous material was made even using a spackle. None of the porous materials prepared this way presented any significant volume shrinkage during the drying process. The properties of the porous materials prepared from different cellulose fibre sources are presented in Table 6.

Example 8

Dimensions of the Porous Material

A wet porous material prepared according to Example 2 was used to fill a mould with 37 cm in length, 27 cm in width, and a thickness of 20 cm. During drying, the water was evaporated from as many directions at possible, usually from the top and bottom. The porous material did not shrink during drying.

Example 9

Different Densities 150 g cellulose fibres (bleached softwood Kraft pulp fibres with 5 wt % water content) were wetted in 1000 g tap water followed by mixing using a Kenwood Chef XL Titanium equipped with a K beater. 75 g of wheat gluten was pre-mixed with 500 g of water using a Vitamixer until a homogenous suspension was obtained. The mixture was then added to the cellulose fibre suspension during mixing. Air was introduced to the mixture by mechanical whipping in the Kenwood Chef XL Titanium equipped with a wire whisk until the desired volume increase was reached (see Table 7). The wet porous material was evenly applied to a mould having a net at the bottom allowing excess water to drain, and the surface layer of the wet porous material was made even using a spackle. The porous material was then dried at 80° C. over-night using a regular drying oven with air flow. The density of the dry porous material obtained for the specific volume increase can be seen in Table 7. As it can be seen in Table 7, the more air is introduced in the wet porous material (i.e. the higher the volume increase), the lower is the density of the dry porous material for the same cellulose:gluten ratio and solid content.

TABLE 6

| Sample | Cellulose fibre source | Cellulose fibres (g) | Water (g) | Gluten (g) | Volume increase (%) | Density of dried porous material (kg/m³) | Properties of dried porous material |
|---|---|---|---|---|---|---|---|
| 1 | Dissolving pulp | 60 | 600 | 30 | 200 | 43 | Homogeneous structure |
| 2 | Softwood | 60 | 600 | 30 | 200 | 43 | Homogeneous structure |
| 3 | Hardwood | 60 | 600 | 30 | 200 | 43 | Homogeneous structure |

TABLE 7

| Sample | Cellulose fibres (g) | Gluten (g) | Water (g) | Volume increase (%) | Density of dried porous material (kg/m³) |
|---|---|---|---|---|---|
| 1 | 150 | 75 | 1500 | 525 | 25 |
| 2 | 150 | 75 | 1500 | 315 | 35 |
| 3 | 150 | 75 | 1500 | 210 | 46 |
| 4 | 150 | 75 | 1500 | 150 | 57 |

Figure 4:
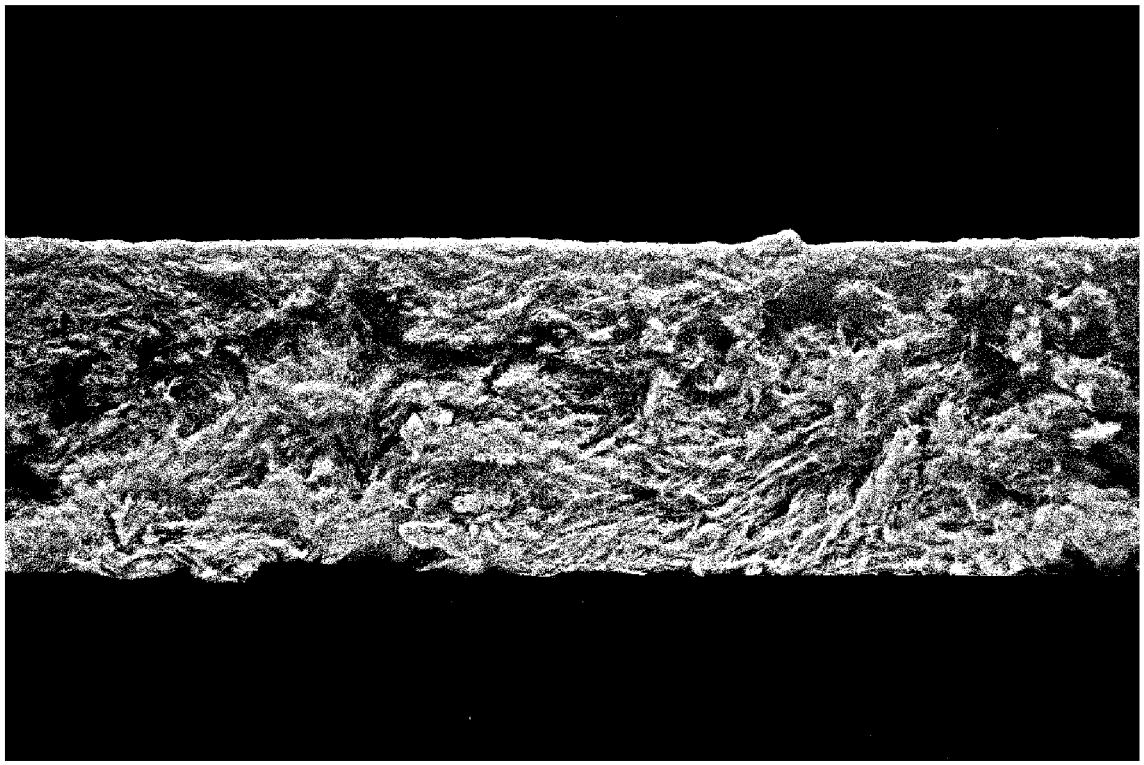
FIG. 4 shows a cross-section of a porous material comprising cellulose fibres and gluten in a ratio 2:1 and a density of about 46 kg/m³.

A cross-section of sample 3 in Table 7 is shown in FIG. 4.

Example 10

Additives to Reduce Flaking 1125 g cellulose fibres (bleached softwood Kraft pulp fibres with 5 wt % water content) were wetted in 6500 g tap water followed by mixing using a Roulette C-Line 60 L mixer equipped with a K beater for 15 minutes at medium speed in order to obtain a homogenous suspension of the cellulose fibres. Then 45 g of xyloglucan (TKP) was suspended in 1000 g hot water using a Vitamixer XL. The xyloglucan suspension was then added to the cellulose fibre suspension, and the resulting mixture was further mixed in the Roulette C-Line 60 L mixer for an additional 15 minutes. Then 563 g of wheat gluten was slowly and continuously added to 2750 g tap water while stirring using a Vitamixer XL at medium speed. The mixing was continued until a homogeneous suspension of gluten in water was obtained. The gluten suspension was then added to the mixture of xyloglucan and cellulose fibres and mixing was continued using the K beater (Roulette mixer) for 5 to 10 minutes at the maximum speed in order to ensure a homogeneous mixture. At this point, the K beater of the Roulette C-Line mixer was replaced by a wire whisk and air was introduced to the aqueous mixture of gluten, cellulose fibres and xyloglucan by mechanical whipping until a volume increase of 300% was reached. The obtained wet porous material was then evenly applied to a mould (95 cm*55 cm*4.5 cm) having a net at the bottom allowing water evaporation, and the upper surface layer of the wet porous material was made even using a spackle. The wet porous material was then dried at 80° C. over-night using a regular drying oven with air flow. The resulting dry porous material had a density of about ~40 kg/m³ and did not present any volume shrinkage or collapse of the structure during the drying process. The dried porous material presented less flaking than the same porous material in the absence of xyloglucan.

Example 11

Comparative Example: Using Egg White as Binding and Foaming Agent 300 g of egg white at 4° C. was whipped with a Kenwood Chef XL Titanium equipped with a wire whisk to a hard consistency. 60 g of cellulose fibres (bleached softwood Kraft pulp fibres with 5 wt % water content) with a dry weight of ~95% were teared to small pieces and soaked in 500 g of deionized water at room temperature. The soaked cellulose fibres and water were thereafter mixed with a Kenwood Chef XL Titanium equipped with a K beater for ~10 minutes. The whipped egg white was then added to the wet cellulose fibres and this new mixture was whipped using a Kenwood Chef XL Titanium equipped with a wire whisk in order to obtain a wet porous material. The whipping/foaming was stopped when the wet porous material had volume increase of 122%. The wet porous material was evenly applied to a mould (27 cm*37 cm*4.5 cm) having a net at the bottom allowing excess water to drain, and the surface layer of the wet porous material was made even using a spackle. The porous material was then heated at 80° C. over-night using a regular drying oven with air flow. The dried porous material obtained this way had shrank half its thickness during the drying step and the final density of the dried porous material was 61 kg/m³. The material is shown to the right in FIG. 1 (the material shown to the left in FIG. 1 is the dried porous material obtained from Example 3, where wheat gluten was used as binding and foaming agent to produce a porous material and which did not experience any shrinkage during the drying process). The dried porous material presented a very weak tensile strength and had to be carefully handled, as a slight pull effect on the material will cause it to break apart.

In another experiment with egg white, 60 g of cellulose fibres (bleached softwood Kraft pulp fibres with 5 wt % water content) with a dry weight of ~95% were tea red to small pieces and soaked in 1300 g of deionized water at room temperature for 10 minutes. Then the wet cellulose fibres and the water were mixed with a Vitamixer at its highest speed for 1 min to obtain a homogeneous cellulose fibre suspension. The suspension was left 10 min at room temperature and then mixed again with a Vitamixer for 1 minute. 40 g of egg white (at 4° C.) was added to the cellulose fibre suspension followed by mixing using a Vitamixer at the highest speed for 1 minute until a homogenous mixture was obtained. The mixture was then transferred to a Kenwood Chef XL Titanium equipped with a wire whisk. Air was introduced to the mixture by mechanical whipping at the highest speed, but the mixture did not foam (i.e. the mixture did not increase in volume) and therefore no porous wet material was obtained. In order to be able to obtain a porous material 4 ml of Yes detergent (diluted to 50% with deionized water) was added to the mixture and the mechanical whipping continued until the wet porous material had a volume increase of 70%. No more air could be introduced in the mixture even although more whipping was applied to the wet porous material (i.e. the mixture did not increase any further in volume). The foamed material was then evenly applied to a mould (27 cm*37 cm*4.5 cm) having a net at the bottom allowing excess water to drain, and the surface layer of the wet material was made even using a spackle. The wet material was then heated at 80° C. over-night using a regular drying oven with air flow. The dried material obtained this way shrank from 4.5 cm to 1.5 cm during the drying step and the final density of the dried material was 80 kg/m³. The dried material obtained this way presented a stronger tensile strength in comparison with the previous example of material comprising cellulose fibres and egg white where the egg white had been whipped before mixing with the cellulose fibres.

Example 12

Comparative Example: Using Gelatine as Foaming Agent 60 g cellulose fibres (bleached softwood Kraft pulp fibres with 5 wt % water content) with a dry weight of ~95% were teared to small pieces. 1300 g of deionized water at room temperature was added to the cellulose fibres and left to soak for ~10 minutes. Then the wet cellulose fibres and the water were mixed with a Vitamixer at its highest speed for 1 minute to obtain homogeneous fibre suspension. 30 g of dry gelatine powder was added to the cellulose fibres suspension followed by mixing using a Vitamixer at the highest speed for 1 minute until a homogenous mixture was obtained. The mixture was then transferred to a Kenwood Chef XL Titanium equipped with a wire whisk. Air was introduced to the mixture by mechanical whipping at the highest speed and the mechanical whipping continued until the wet material had a volume increase of 150%. The foamed material was then evenly applied to a mould (27 cm*37 cm*4.5 cm) having a net at the bottom allowing excess water to drain, and the surface layer of the wet material was made even using a spackle. The material was then heated at 80° C. over-night using a regular drying oven with air flow. The thickness of the dried material obtained this way shrank from 4.5 cm to 2 cm during the drying step and the final density of the dried porous material was 64 kg/m$^3$.

Example 13

Figure 6:
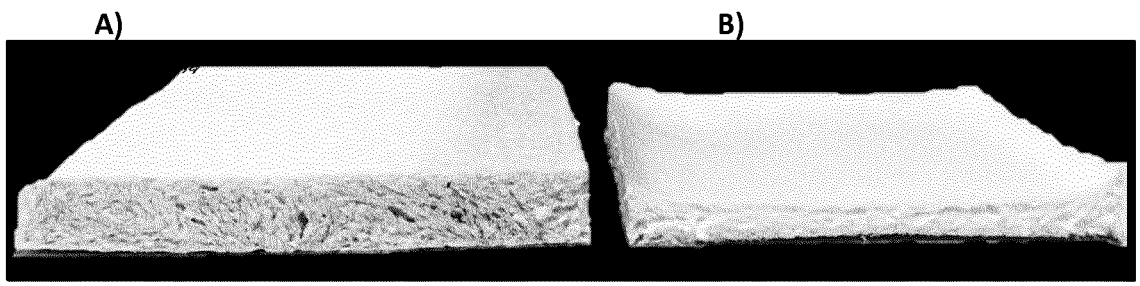
FIG. 6 shows materials prepared with (a) cellulose fibres and gluten and (b) cellulose fibres and casein.

Comparative Example: Using Casein as Binding and Foaming Agent 120 g cellulose fibres (bleached softwood Kraft pulp fibres with 5% water content) with a dry weight of ~95% were wetted in 600 g water followed by mixing using a Kenwood chef XL Titanium equipped with a K beater. 60 g of casein (Casein sodium salt from bovine, Sigma-Aldrich) was pre-mixed with 600 g water using a Vitamixer until a homogeneous suspension was obtained. The mixture was then added to the cellulose fibre suspension during mixing. Air was introduced to the mixture which was foamed by mechanical whipping in the Kenwood chef XL Titanium equipped with a wire whisk until a volume increase of 360% was reached. The wet material obtained this way was evenly applied to a mould (27 cm*37 cm*4.5 cm) having a net at the bottom. The surface of the foam was made even with a spackle. The material was then dried at 80° C. over-night using a regular drying oven with air flow. The dried material presented a collapsed structure (the material already collapsed after just 10 min in the oven) and presented a final shrinkage of more than 40% (the material was ~2.6 cm in height after drying). Moreover, the structure of the dried material was very weak, presenting delamination and being visible the presence of fibre bundles suggesting an inhomogeneous material (FIG. 6b). The final density of the foam was 37.9 kg/m$^3$.

As comparison, the exact same recipe and method, as described above for cellulose fibres and casein, was used to produce a porous material containing cellulose fibres and gluten. In this case, 120 g cellulose fibres (bleached softwood Kraft pulp fibres with 5% water content) with a dry weight of ~95% were wetted in 600 g water followed by mixing using a Kenwood chef XL Titanium equipped with a K beater. 60 g of wheat gluten (Lantmännen) was pre-mixed with 600 g water using a Vitamixer until a homogeneous suspension was obtained. The mixture was then added to the cellulose fibre suspension during mixing. Air was introduced to the mixture which was foamed by mechanical whipping in the Kenwood chef XL Titanium equipped with a wire whisk until a volume increase of 360% was reached. The wet porous material obtained this way was evenly applied to a mould (27 cm*37 cm*4.5 cm) having a net at the bottom. The surface of the foam was made even with a spackle. The porous material was then dried at 80 C over-night using a regular drying oven with air flow. The dried material presented a stable structure with a minimal shrinkage during the drying (FIG. 6a). The structure of the porous material containing cellulose fibres and gluten had a homogeneous structure, presenting a final density of ~30 kg/m$^3$.

Example 14

Comparative Example: Using Casein as Binding and Foaming Agent for Preparing a Low Density Foam (~15 kg/m$^3$)

60 g cellulose fibres (bleached softwood Kraft pulp fibres with 5% water content) with a dry weight of ~95% were wetted in 600 g water followed by mixing using a Kenwood chef XL Titanium equipped with a K beater. 30 g of casein (Casein sodium salt from bovine, Sigma-Aldrich) was pre-mixed with 700 g water using a Vitamixer until a homogeneous suspension was obtained. The mixture was then added to the cellulose fibre suspension during mixing. Air was introduced to the mixture which was foamed by mechanical whipping in the Kenwood chef XL Titanium equipped with a wire whisk until a volume increase of 510% was reached which should provide a final material with a density ~15 kg/m$^3$. The wet material obtained this way was evenly applied to a mould (27 cm*37 cm*4.5 cm) having a net at the bottom. The surface of the foam was made even with a spackle. The material was then dried at 80° C. over-night using a regular drying oven with air flow. The dried material presented a completely collapsed structure (the material already started collapsing after just some minutes the oven) and presented a final structure that resembled more a film (or a web) than a three dimensional foam structure (FIG. 7b). The shrinkage in height was more than 90% of its initial value before drying. FIG. 7a presents a picture of the foam obtained following example 1 (sample 4), which is a foam containing cellulose fibres and gluten with a ratio ~2:1 and final density of 11 kg/m$^3$ (cross section of the foam in FIG. 5).

Example 15

Comparative Example: Using Cellulose Particulates with Low Aspect Ratio

Figure 8:
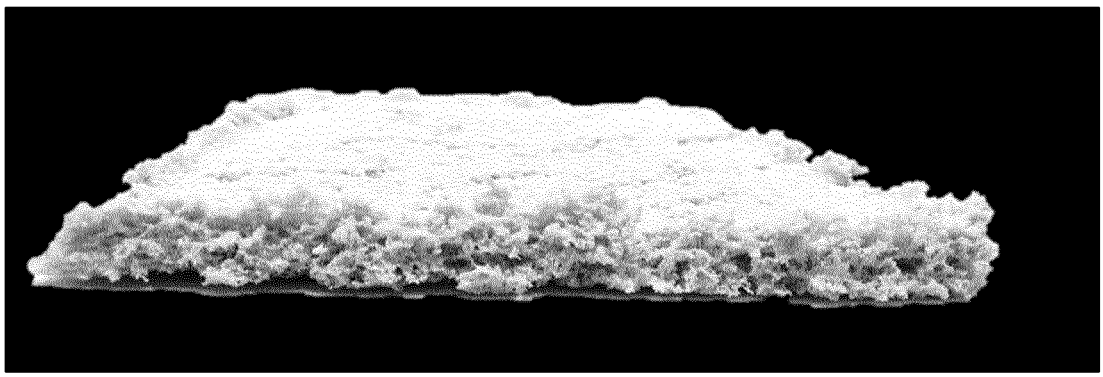
FIG. 8 shows a material prepared from cellulose particles with an average aspect ratio of about 3. The thickness of the sample is ~0.5 cm.
Figure 9:
FIG. 9 (a) shows cellulose fibres with an aspect ratio well above 10, and (b) shows cellulose particulates with an aspect ratio of about 3.
Figure 9:
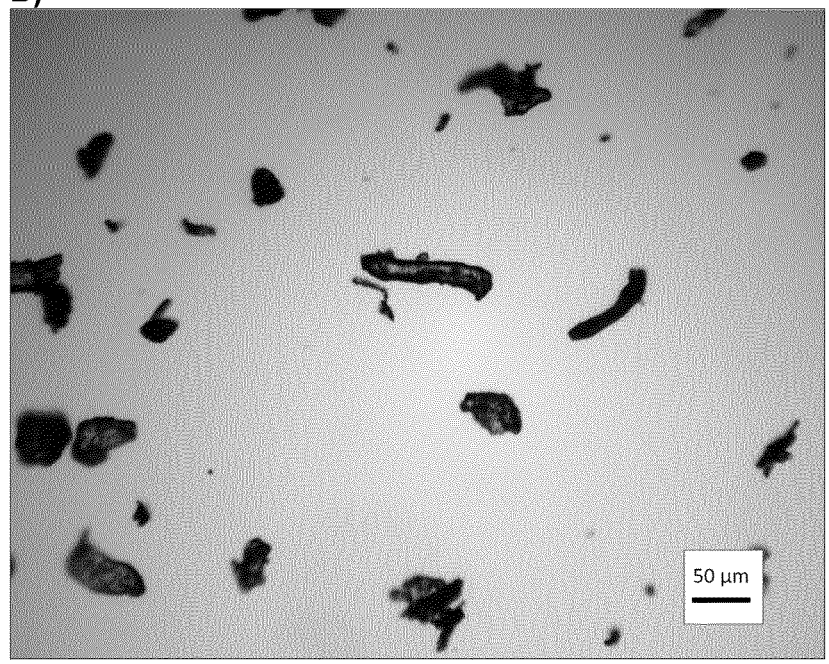

Cellulose particulates were obtained by grinding longer fibres with an initial aspect ratio higher than 10 until the particulates presented in a majority a low aspect ratio of about 3. See FIG. 9 for comparison of the cellulose fibres (with high aspect ratio >10) and the cellulose particulate (with aspect ratio about 3). 60 gr of cellulose particulates were wetted in 300 g tap water followed by mixing using a Kenwood chef XL titanium. 30 g wheat gluten was premixed with 300 g tap water using a Vitamixer until a homogeneous suspension was obtained and then added to the cellulose particulate suspension. This mixture of gluten, cellulose particulates and water did not look as homogeneous as mixtures of gluten with cellulose fibres with higher aspect ratio and a clear water separation was visible. Air was introduced to this new mixture by mechanical whipping in the Kenwood chef XL Titanium (equipped with a wire whisk). The mixture was whipped until a volume increase of 360% was reached (which should provide a material with a density ~30 Kg/m$^3$). The wet material obtained this way was evenly applied to a mould (27 cm*19 cm*4.5 cm) having a net at the bottom. Water was allowed to drain for ~5 min before inserting the wet foamed material into the oven. The material was dried at 80 C over-night. The dry material presented a collapsed structure, with a height under 0.5 cm, meaning that the material had shrunk almost 90% of its height during the drying procedure. The structure of the dry material resembled a compact board, hard but quite fragile at the same time, with many inhomogeneities in its structure (FIG. 8).

The invention claimed is:

1. A porous material comprising liberated cellulose fibres and gluten, wherein the weight proportion of liberated cellulose fibres to gluten is from 1:6 to 6:1, wherein the porous material has a density of from 5 to 50 kg/m³ as calculated on dry porous material, wherein the porous material comprises at least 12.5 wt % gluten as calculated on the total weight of dry porous material, wherein the gluten comprises one or more of gliadin, glutenin, and wheat gluten, and wherein the porous material comprises at least 30 wt % liberated cellulose fibres, as calculated on the total weight of dry porous material.

2. A porous material according to claim 1, wherein the liberated cellulose fibres have a mean width of 0.01 to 0.05 mm.

3. A porous material according to claim 1, wherein the liberated cellulose fibres have a mean fibre length of from 0.1 to 65 mm.

4. A porous material according to claim 1, wherein the liberated cellulose fibres originate from wood.

5. A porous material according to claim 1, wherein the liberated cellulose fibres have an aspect ratio above 10.

6. A porous material according to claim 1, wherein at least 50% of the total volume of void spaces in the porous material comprises interconnected pores.

7. A porous material according to claim 1, wherein the porous material is a hydrophobic material that comprises a wax.

8. A porous material according to claim 1, wherein the porous material has been heat treated such that the porous material is hydrophobic.

9. A method for the preparation of a porous material comprising cellulose fibres and gluten, wherein the method comprises:
   foaming cellulose fibres and gluten in a solvent containing water by introducing a gas to form a porous material, and
   drying the porous material,
   wherein the weight proportion of cellulose fibres to gluten is from 1:6 to 6:1, and wherein the porous material has a density of from 5 to 50 kg/m3 as calculated on dry porous material, wherein the porous material comprises at least 12.5 wt % gluten as calculated on the total weight of dry porous material, wherein the gluten comprises one or more of gliadin, glutenin, and wheat gluten, and wherein the porous material comprises at least 30 wt % liberated cellulose fibres, as calculated on the total weight of dry porous material.

10. A method according to claim 9, wherein drying is performed until the porous material comprises less than 15 wt % water.

11. A method according to claim 9, wherein a mixture of cellulose and gluten in a solvent comprising water is formed before foaming the mixture.

12. A method according to claim 9, wherein a foam of gluten in water is formed before a suspension of cellulose is added to the foam of gluten.

13. A method according to claim 9, wherein foaming is made by introducing air.

14. A method according to claim 9, wherein the porous material is hydrophobic.

* * * * *